Patented Apr. 2, 1935

1,996,079

UNITED STATES PATENT OFFICE 1,996,079

MANUFACTURE OF ARTICLES OF OR CONTAINING RUBBER OR SIMILAR MATERIAL

Edward Arthur Murphy, Erdington, Birmingham, England, assignor to American Anode Incorporated, Akron, Ohio, a corporation of Delaware No Drawing. Application July 1, 1931, Serial No. 548,269. Renewed June 13, 1934. In Great Britain October 20, 1930

10 Claims. (Cl. 18—58)

This invention concerns improvements in the manufacture of articles of or containing rubber or similar material by forming deposits of aqueous dispersions thereof on supports or backing strata.

The object of the invention is to employ coagulating media in a substantially non-fluid or solid condition and preferably in thin, uniform layers, thereby permitting the production of even coagulated deposits and particularly the sharp registration of designs or markings, should such be provided on the aforesaid supports or backing strata.

According to the invention the process for the production of articles of or containing rubber or similar materials from aqueous dispersions thereof of the kinds hereinafter specified comprises coating supports or backing strata which may be shaped such as formers or moulds, with a coagulating medium comprising a coagulant for the aqueous dispersions aforesaid in admixture with a water-insoluble material dissolved in volatile solvent and thereafter coating the thus treated supports or backing strata with the aqueous dispersions aforesaid.

The coagulant is preferably of a non-volatile nature and is used in the form of a dilute solution in a volatile solvent in admixture with a water insoluble material in solution in the volatile solvent. On evaporation of the solvent the coagulant is left in concentrated form and is distributed evenly over the surface of the supports or backing strata. The coagulant is preferably of a hygroscopic nature.

Suitable coagulants for the purpose of this invention are, for example, sulphuric acid, lactic acid or zinc chloride or mixtures such as zinc chloride and a non-volatile viscous liquid such as glycerine or glycol which does not solidify.

The presence of the aforesaid water-insoluble material is for the purpose of producing a layer of coagulating medium having a matt varnish-like surface capable of resisting spontaneous disruption by e. g. surface tension effects and of decreasing the slippage tendency of any superposed coagulated dispersion. This layer of coagulating medium should also be of an adherent nature.

Suitable water-insoluble materials are, for instance, resinous or waxy substances such as rosin, tristearin, shellac, stearic acid, metallic soaps insoluble in water.

Examples of suitable volatile solvents are acetone, alcohol or ether.

When a coagulated layer is produced on a support or backing stratum such as a former having an uneven surface, for instance, a former provided with a moulded or engraved design, a fluid layer between the former and the coagulated layer would tend to prevent the registration of the design or marking on the coagulated layer.

Furthermore, when a thin layer of latex is coagulated on a former of appreciable size such as, for instance, a glove or bathing cap, the presence of an intermediate fluid layer facilitates distortion of the coagulated layer caused by shrinkage and gravitational effects.

It has been found according to the present invention that the aforesaid difficulties can be avoided by coating supports or backing strata preferably with extremely thin uniform layers of coagulant of a non-fluid or solid nature in order that the indentation forming part of the pattern on the supports or backing strata do not become filled.

The small quantity of water-insoluble, resinous, fatty or waxy substance admixed in the volatile solvent according to the present invention tends to make the coagulant film adhere to the surface of a former by presumably overcoming the surface tension effects in the residual coagulant film which would tend to break into drops, especially on a glazed or greasy surface. The aforesaid resinous, fatty or waxy substance dissolved in a volatile solvent is subsequently precipitated on evaporation of the volatile solvent, leaving a thin film thereof insoluble in water. Such a matt varnish-like film maintains the continuity of the non-volatile coagulant film indefinitely. Moreover, the adhesive nature of the resinous or waxy film, its matt surface and the fact that it is not influenced by the water of the aqueous dispersion of rubber all help to reduce any tendency to slipping of the coagulated layer due e. g. to shrinkage. Formers, for instance, treated with coagulating media as described may, if required, be stored some days before contacting with the aqueous dispersions of rubber without materially affecting the uniformity and rate of deposition of the layer of coagulum produced.

If desired the coagulation of the coatings of the dispersions aforesaid may be aided by the application of further coagulating means.

The invention also includes the manufacture of articles of appreciable thickness by repeated coatings with coagulating media and the aqueous dispersions aforesaid.

The coagulating medium as well as the aqueous dispersions aforesaid can be applied by any one or more of the known operations of dipping, pouring, spreading or spraying. Supports or backing strata or formers may be of any suitable material such as glass, metal, porcelain, hard or soft rubber, clay or fabric.

The emulsions or dispersions comprise natural or artificial aqueous dispersions of rubber or similar vegetable resins such as gutta-percha, balata with or without the addition of aqueous dispersions or emulsions of rubber-like substances such as the so-called synthetic rubbers, mineral rubbers or rubber substitutes such as factice or rubber reclaim, or rubber waste or oils, for example, rape oil or vulcanized oils or cellulose esters or proteins, for example, casein.

The main dispersions may be concentrated and/or compounded or compounded and subsequently concentrated.

The compounding ingredients may be chosen from vulcanizing agents such as sulphur, and organic accelerators, fillers and reinforcing agents such as whiting, clay, barium sulphate, lithopone, lamp black, gas black, zinc oxide or powdered ebonite or vulcanite, colouring matters, preservatives or softeners.

Compounded concentrates such as are described in U. S. specification No. 232,705 are particularly suitable for use.

Aqueous dispersions of synthetic rubbers with or without any one or more of the hereinbefore mentioned compounding ingredients may also be used.

The formers or moulds may be porous or non-porous. If desired the formers may be internally heated in any suitable manner for example, by passing a fluid heating medium through the moulds or by electrical heating.

If desired, the reagents employed as coagulants may be such as only become effective on heating.

Examples of carrying the invention into effect are as follows:—

Example 1

A coagulating medium suitable for the production of thin rubber dipped goods from rubber latex, such as surgeons' gloves, can be made of the following composition:—

|  | Parts by weight |
|---|---|
| Rosin | 2.0 |
| Concentrated sulphuric acid | 2.5 |
| 95% alcohol | 100.0 |

A former, for instance, a glazed porcelain former, is then dipped into this solution, withdrawn and allowed to stand for about one minute until the alcohol has evaporated. It can then be dipped into a latex bath immediately or stored for dipping as required.

Example 2

Thin rubber sheets may be made from rubber latex by treating the surface of an endless flexible band such as fabric with a solution of coagulating medium of the following composition:—

|  | Parts by weight |
|---|---|
| Rosin | 2.0 |
| Zinc chloride | 2.0 |
| 95% alcohol | 100.0 | allowing the volatile solvent to evaporate and then passing the thus treated fabric into a latex mixing when it becomes covered with a layer of coagulum. The absence of free liquid between the surface of the backing strata and the coagulum is of particular value in this operation in preventing slipping of the coagulum on removal of the latex bath.

This invention has been found applicable to the manufacture of articles of rubber of moderate or substantial thickness such as, for example tobacco pouches, gloves with or without fabric lining, rubber sheeting, fabric reinforced rubber articles, rubberized fabric and rubber footwear.

What I claim is:

1. A process which comprises immersing in an aqueous rubber dispersion a form coated with a layer of a solid composition comprising a water-soluble coagulant and a water-insoluble amorphous solid.

2. A process which comprises coating a form with a thin film of a composition comprising a coagulant and a water-insoluble amorphous material, and associating the coated form with an aqueous dispersion of rubber.

3. A process which comprises coating a form with a thin film of a solution of a water-soluble coagulant and a water-insoluble material in an organic solvent, and associating the coated form with an aqueous dispersion of rubber.

4. A process which comprises coating a form with a film of a solution of a water-soluble coagulant and a water-insoluble material in an organic solvent, evaporating the major part of the solvent, and associating the coated form with an aqueous dispersion of rubber.

5. A process which comprises coating a form with a film of a solution of a water-soluble coagulant and a water-insoluble amorphous material, evaporating the major part of the solvent, and immersing the coated form in an aqueous dispersion of rubber.

6. A process which comprises coating a form with a solution of a hygroscopic water-soluble coagulant and a water-insoluble amorphous material in an organic solvent, evaporating the major part of the solvent, and immersing the coated form in an aqueous dispersion of rubber.

7. A process which comprises coating a form with a solution of a hygroscopic coagulant salt and a water-insoluble amorphous material in an organic solvent, evaporating the major part of the solvent, and immersing the coated form in an aqueous dispersion of rubber.

8. A process which comprises coating a form with a solution of a water-soluble coagulant and a substance selected from the class consisting of water-insoluble resins, fats, waxes, and soaps, and immersing the coated form in an aqueous dispersion of rubber.

9. A process which comprises coating a form with a solution of a water-soluble coagulant and a substance selected from the class consisting of water-insoluble resins, fats, waxes, and soaps in an organic solvent, evaporating the major part of the solvent, and immersing the coated form in an aqueous dispersion of rubber until a layer of rubber of the desired thickness is coagulated thereon.

10. A process which comprises coating a form with a solution of a hygroscopic coagulant salt and a substance selected from the class consisting of water-insoluble resins, fats, waxes and soaps in an organic solvent, evaporating the major part of the organic solvent, and immersing the coated form in an aqueous dispersion of rubber until a layer of rubber of the desired thickness is coagulated thereon.

EDWARD ARTHUR MURPHY.